May 15, 1962
M. ROSENTHALER
3,034,171
APPARATUS FOR FORMING EXTRUDIBLE MEAT PRODUCTS
Filed July 17, 1958
2 Sheets-Sheet 2
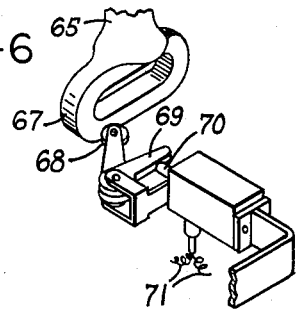
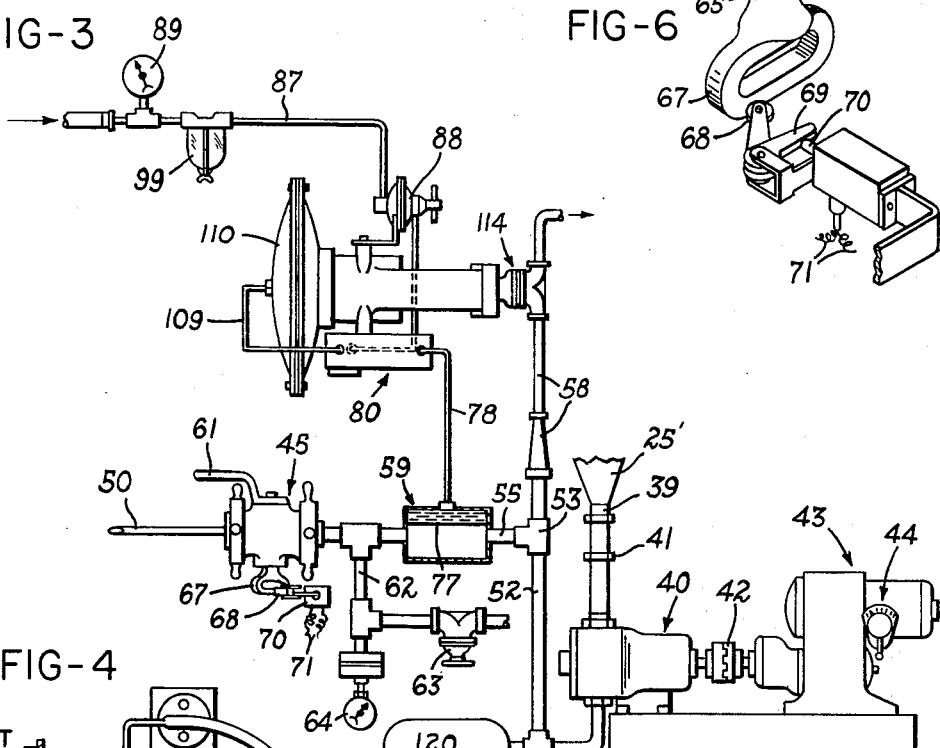
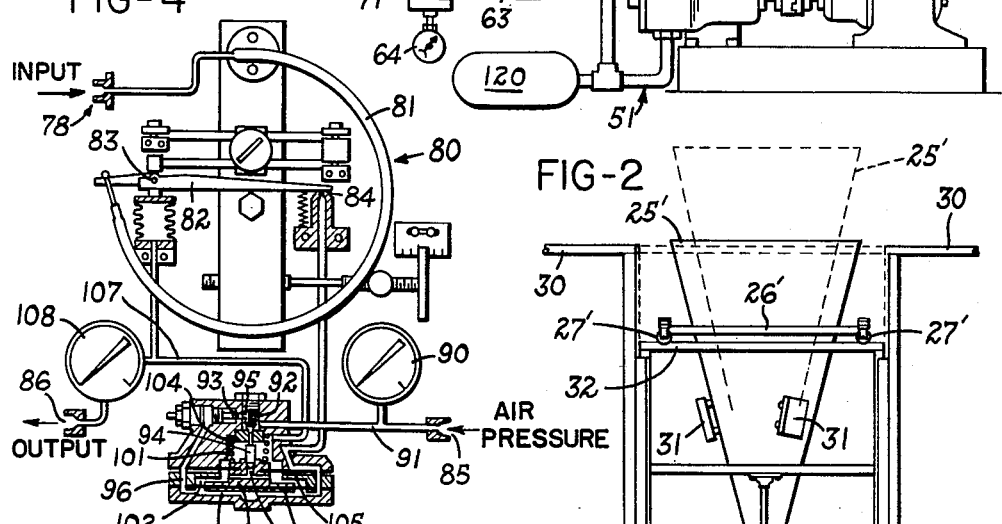
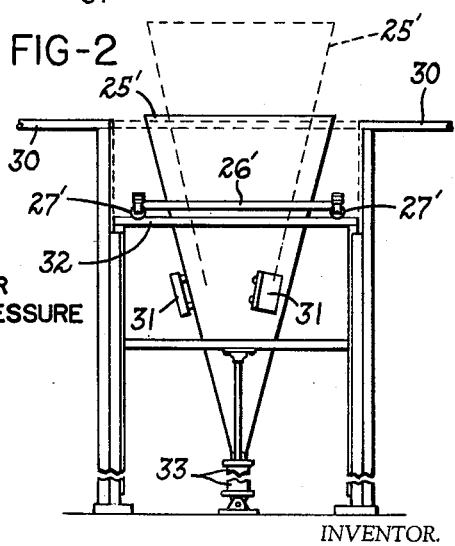
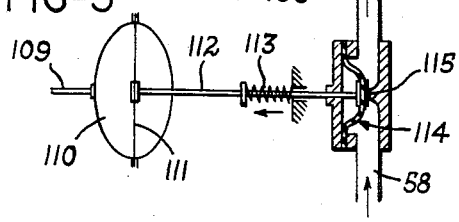
INVENTOR.
MILTON ROSENTHALER
BY
Marechal, Biebel, French & Bugg
ATTORNEYS United States Patent Office 3,034,171
Patented May 15, 1962

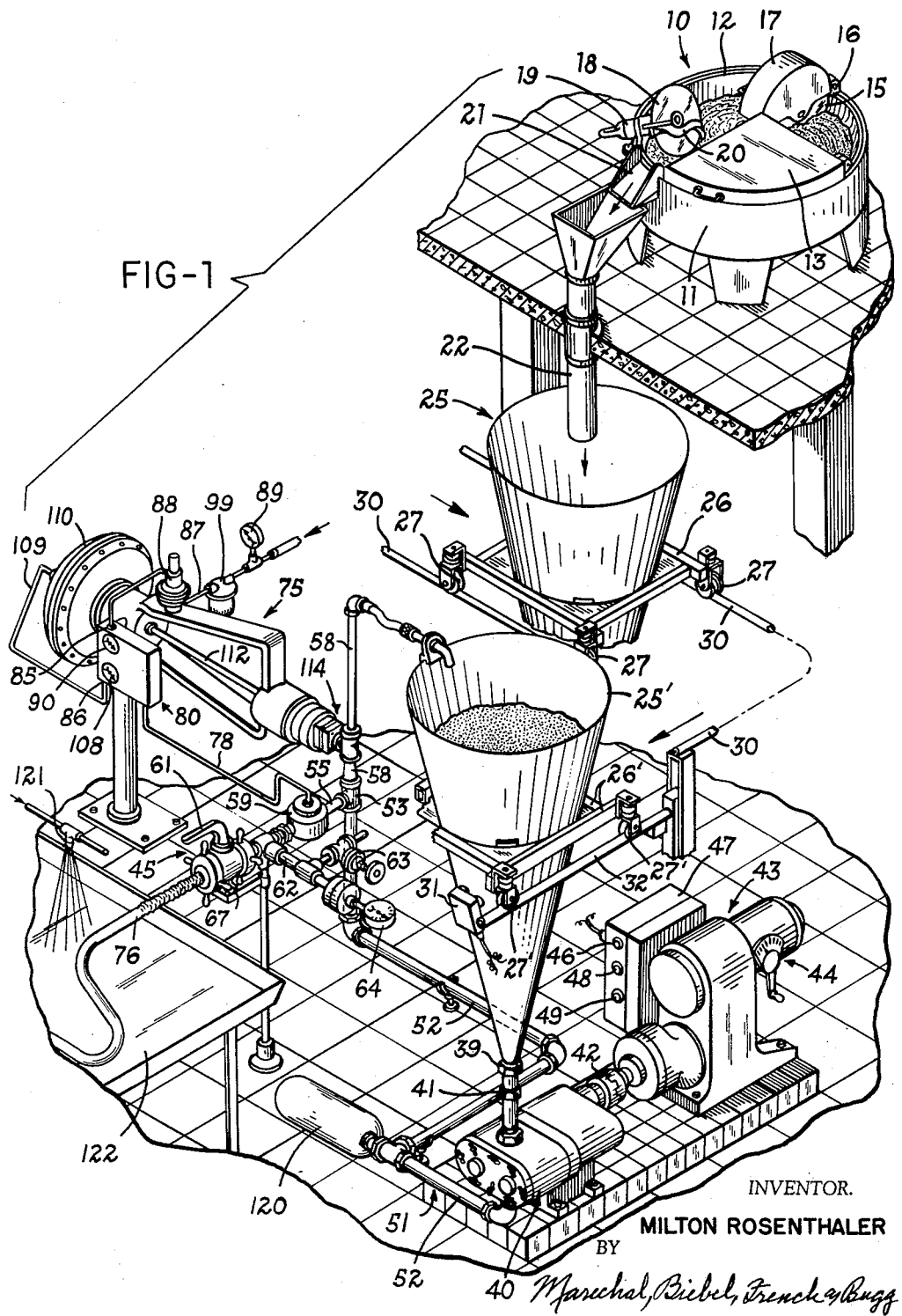

3,034,171
APPARATUS FOR FORMING EXTRUDIBLE
MEAT PRODUCTS
Milton Rosenthaler, Dayton, Ohio, assignor to The
Sucher Packing Co., Dayton, Ohio, a corporation of
Ohio
Filed July 17, 1958, Ser. No. 749,220
5 Claims. (Cl. 17—35)

This invention relates to a process and apparatus for conveying and forming extrudible meat products.

In the manufacture of meat products such as bologna, loaf, weiners and the like, the meat material is first converted to a thick emulsion state and is thereafter conveyed to what is known in the art as a "stuffer." The stuffer is essentially a cylindrical vat with the base forming a piston movable upwardly by fluid pressure to pressurize the meat which is forced out of the stuffer through a horn and into an artificial or natural casing.

Many serious shortcomings are involved in this described procedure. The stuffer tends to make a nonuniform product because the meat is discharged from the horn with a varying pressure which is changeable for a number of reasons such as change in viscosity of the emulsion, change in frictional resistance of the stuffer, etc. The pressure also varies depending upon the number of stuffers in operation, there being generally a single pressure source for a number of these stuffers. Handling the meat by this described method of manufacture is awkward and time consuming because the stuffer is batch loaded and the meat material is usually shoveled into the stuffer by hand, so that productivity is severely limited. Also, the apparatus itself is difficult to clean and the stuffer is the most likely source of contamination of the meat product.

In the present invention it is intended to eliminate the conventional stuffer arrangement with its associated shortcomings. It is an object of the present invention to convey the meat in its emulsified state through a series of conduits, pump and control means which are completely enclosed so that the meat is never exposed en route to possible contamination by foreign material. These devices are so constructed that the meat contacting surfaces are never exposed to the exterior and therefore are less liable to contamination by bacteria and foreign material and it is thus possible to improve the hygienic standards of meat packaging so as to safeguard the health of the consumer.

Another object of the invention is to provide an economical high capacity system for producing extrudible meat products in a semi-continuous process in which the meat material is pumped through a rotary pump and then into a series of conduits leading to an extruder horn. The process is interrupted only to periodically attach additional hoppers or large size containers of emulsified meat, which by their bulk, supply sufficient meat to run the apparatus for appreciable periods of time without stoppage. Manual handling of the meat is wholly eliminated, and "down" time of the apparatus is reduced to a minimum.

A further object of the invention relates to the product itself. This object of the invention is to achieve uniform "sizing" of the meat product. By this it is meant that the weight or quantity of meat material per unit length of product will be substantially constant. This enables the package of meat to be within certain weight tolerances for any given number of units of the product. Thus a dozen of weiners manufacturable by this process will have a specified weight or fall closely within an acceptable weight range.

This object of the invention is based on a close tolerance control of the pressure on the meat material as it is extruded into the casing for the meat material, this pressure being determinative of the linear discharge rate of the meat material from the extruder. The operator frees or retards the casing which receives the meat material, and depending upon the uniformity of discharge rate for the meat material, the operator can achieve a uniformity of sizing of the meat product.

It is further desirable in achieving uniform sizing that the meat material be thoroughly stripped of any gaseous content. The uniformity of extrusion pressures and dedegassing of the meat material are achieved by means of a meat-recycling arrangement wherein a part of the meat, instead of being extruded into the casing, is continuously returned to the pump for recycling. The amount of this recycling is made responsive to the pressure on the meat as it is being extruded so as to hold within predetermined tolerance limitations the pressure on the meat at the extruder.

It has been found that as the recycling meat separates from the main flow of meat material, substantially all the entrapped air leaves with the meat in the recycling line so as to be removed from the meat material discharging through the extruder nozzle. The reason for this is not wholly understood but its occurrence is established even if not explainable.

It is characteristic of the invention that during operation, the apparatus does not develop excessive heating of the meat material so as to cause melting and separation of the fat content of the meat. If this should occur the meat product develops unattractive "fatty ends" which render the product of less pleasing and palatable appearance.

It will be seen from the construction of the apparatus as a whole, that it is readily cleaned by the conventional cleaning solutions and can be easily rinsed free of meat material by steam, hot water, etc. The parts of the apparatus can be made of stainless steel which is corrosion resistant and is highly inert so as to impart no taste to the product. Parts of the apparatus can be coated with "Teflon" (tetrafluoroethylene) which, because of its lubricity, aids the passage of the meat material.

Other objects and advantages of this invention will be apparent from the following description, the accompanying drawings and the appended claims.

In the drawings—

FIG. 1 is an isometric view of the packaging and meat-processing apparatus with certain parts being broken away to illustrate the path of flow of the food product;

FIG. 2 is a side view of the hopper arrangement viewed from the right hand side thereof in FIG. 1 with parts being broken away;

FIG. 3 is a detail view of the conduits system through which the meat is distributed and some of the control elements combined with said conduit system;

FIG. 4 is an enlarged sectional view of the Bourdon tube and associated structure for regulating the meat pressure in the extruding line;

FIG. 5 shows the diaphragm and valve arrangement for controlling the cross sectional area of the recycling line; and FIG. 6 shows the pump control arrangement in conjunction with the control handle in the extruding line.

Referring now to the drawings, there is shown at a raised elevation a meat cutter designated generally by reference numeral 10. The cutter 10 receives the meat material and reduces it to an emulsion of viscid paste-like consistency similar to peanut butter and like emulsions.

The cutter 10 consists of a vat or housing 11 having an interior rotatable liner 12 which is partially closed by a cover 13 extending over one sector of the vat. A plurality of cutter disk knives 15 are hinged at 16 to the edge of the vat 11 and are rotatable to slice up and churn or agitate the meat material as it is caused to move past the disk knives 15. A protective shield 17 is provided over the knives as a safety precaution. The cutter produces a chopping action which reduces the meat material to the desired consistency and fineness, the meat then being in an essentially emulsified state.

Once the meat is emulsified and reaches the desired consistency it is unloaded by a rotatable wheel 18 which is dipped into the emulsified meat material and is power rotated by an attached motor 19. The emulsified meat material clings to the wheel 18 and as it is raised upwardly from the vat it becomes scraped off by the non-rotatable plough 20 and falls over the edge of the vat 11 where it is caught in a chute 21 which directs it to a stand pipe 22. The stand pipe gravity feeds the meat into conical hopper 25.

While any transporting means for the meat material such as buckets, screw conveyors and the like is satisfactory, the means illustrative of the invention consists of hoppers 25 which may be filled with emulsified meat in large quantities in the order of 600–700 lbs. loads. The hoppers may be immediately run or stored depending upon production scheduling.

The hoppers 25 are supported in a rectangular brace 26 having rollers 27 at the corners thereof mounted on rails 30 which permit the hoppers 25 to move into meat-discharging position, or conveyed to storage. The meat-discharging position of the hopper is indicated by hopper 25' while the hopper 25 is in a loading position. The hopper 25' may be maintained permanently in the position indicated in FIG. 1 and then filled from time to time with buckets of meat material which are filled at the cutter 10 and then transported in some convenient manner as for example by rail or the like to fill the hopper 25'.

Each hopper 25 may be provided with a number of electric vibrators 31 as shown in FIGS. 1 and 2 which agitate the meat material in the hopper to ensure a steady vertical descent of all the meat material.

After the hopper 25 is filled it is conveyed on the rails to meat discharging position indicated by hopper 25'. When the brace 26 reaches section 32 of the rails 30, the hopper 25' is lowered by hydraulic jacks 33 (FIG. 2) from the dotted position to the full line position, still referring to FIG. 2. When the hopper is completely lowered the bottom 39 is fastened to rotary impeller pump 40 through quick disconnect coupling 41.

The rotary pump 40 which reveices the meat material from the hopper includes the usual impellers (not shown) which are synchronously driven through a coupler 42 by a motor 43 having a motor speed control mechanism indicated generally by reference numeral 44. The motor 43 is controlled further by a switch 46 on control panel 47. The other switches 48 and 49 are to actuate the vibrators 31 and to lower the hopper by operation of hydraulic jack 33. After switch 46 is operated to energize the motor 43, the motor 43 is thereafter controlled by a switch at the extruder device 45 in a manner to be fully described later.

Suitable pumps 40 for this purpose may be that shown and described in U.S. Patents 2,096,490; 2,193,273; or 2,279,136. The control 44 for the pump may be that shown in U.S. Patent 2,711,102.

It is important that the pump 40 transmit the meat material without developing excessive surges in the meat flow. It has been found that these surges tend to cause objectionable inclusion of air in the meat material. While the pump described is capable of producing satisfactory products, other pumps, having surge free pumping action may be advantageously used.

The operating speeds of pump 40 must be capable of fine degrees of adjustment to correspond with the nozzle size of the extruder horn 50 which forms a part of the extruder device 45 so that meat material will not become impacted in the pump.

Leading from the pump 40 is a conduit system 51 consisting of a series of conduit lines 52 leading to a T 53 (FIGS. 1, 3) where the flow of meat is divided into a main meat flow which is discharged through extruding branch line 55 and a subsidiary meat flow which passes through reduced diameter recycle branch line 58. The conduit system 51 in actual installations may be reduced in length and number of turns from the illustration in order to reduce friction and pressure drop on the meat material.

In extruding branch line 55, there is a senser 59 (forming a part of the system for controlling the meat material flow) and thereafter the extruder device 45 which includes a control lever 61 which is turned 90° back and forth from the position shown in FIG. 1 to operate a valve (not shown) to turn the flow of meat full off or full on.

The extruder device 45 is constructed to operate with various size extruder nozzles or "horns" 50 as they are sometimes referred to in the art by partially disassembling the device 45 and slipping the selected nozzle in place. The contents of the hopper 25' can bypass the extruder nozzle 50 and empty through line 62 and normally closed valve 63. This emptying occurs with the control lever 61 in a fully closed position.

The line 62 may also include a pressure gauge 64 which provides the operator with a constant check as to the meat extruding pressure conditions.

At the lower end of the stem 65 of control lever 61 (the part extending through extruder device 45 FIG. 3) is formed a boss 67 (FIG. 6) acting against cam follower 68 on bellcrank 69. The bellcrank operates a microswitch 70 having leads 71 connecting with the motor 43 to control actuation thereof.

The cam 67, switch 70 and control lever 61 are so arranged that the control lever 61 is turned to almost full "on" position before the switch 70 is actuated to energize the motor 43; similarly, the motor 43 is shut off when the control lever 61 is only partially closed. Thus, the motor 43 can never be energized to transfer meat in the conduit system 51 with the control lever 61 in a closed position so that meat material will not become impacted therein.

The regulating system 75 functions to maintain a substantially constant pressure of meat discharging from the extruder nozzle 50 and into the casing 76.

It may be stated here that extruding pressure is an important factor to proper sizing of meat product not so much because the pressure will densify the meat material but because the pressure determines the linear extrusion rate of the meat energizing from the extruder horn 50. The linear rate of extruding meat must be held constant in order to achieve a uniform size product and for this reason the pressure must be held within close limits. The convenient location of pressure gauge 64 gives the operator who is stationed at the extruder a means for constant checking of the critical extrusion pressure.

A senser mechanism 59 (FIG. 3) consisting of a hydraulic fluid backed diaphragm 77 has its fluid line 78 connected with a pressure regulating mechanism designated generally by reference numeral 80 (FIGS. 3, 4). At the end of the line 78 is a Bourdon tube 81 which operates a lever 82 pivoted at 83 and arranged through its end to open and close a port 84. For details of operation of the Bourdon tube in a pneumatic control mechanism reference may be made to U.S. Patent 2,549,011.

The opening and closing of port 84 serves to regulate the amount of air pressure to be transferred through the regulating mechanism 80. The inlet for the air pressure is port 85, and the outlet is port 86. The lines 87 bringing the air pressure to the regulating mechanism 80 may include a gauge 89, filter 99, valve 88, etc.

Air pressure from the inlet port 85 is measured by gauge 90 and is passed through line 91 to a chamber 92 having an outlet 93 controlled by lap valve 94. The valve 94 is spring loaded by spring 95 to a normally closed position. A second line 96 leading from chamber 92, connects with chamber 97 having a movable wall diaphragm 98 which is connected with a reciprocable regulator mechanism 100 which also contacts and operates lap valve 94. Spring 101 bears against the regulator mechanism 100 to oppose the force developed by air pressure in chamber 97 on the diaphragm 98.

A chamber 102 between chambers 104 and 97 is opened to atmosphere and is covered at opposite sides by diaphragms 98 and 105. The lap valve 94 controls a port 106 in regulator mechanism 100 connecting chambers 102 and 104.

The pressure in chamber 104 is the regulated pressure which is transmitted through line 107, and the outlet port 86. A gauge 108 registers the amount of air pressure transmitted from the mechanism 80. The pressure from outlet port 86 is passed through line 109 (FIGS. 1, 3 and 5) to a pressure chamber 110 having a movable diaphragm 111 connected with a rod 112 which is spring loaded by spring 113 in the direction indicated by the arrow. The rod 112 is connected with a valve 114 which controls the effective cross sectional area of the recycle line which is the reduced diameter branch 58. The valve 114 acts in conjunction with valve seat 115 and thus controls the extent of recycling the subsidiary flow of meat in branch line 58.

While the specific construction and operation of regulator mechanism 80 forms no part of the present invention, it is intended that the regulator mechanism 80 will recycle meat responsively to pressure in extruding branch line 55 so that the meat pressure in line 55 is closely controlled.

Thus, when pressure in line 55 rises above a certain level the Bourdon tube 81 senses the pressure rise and acting through lever 82, the port 84 is uncovered, relieving pressure in chamber 97 and allowing spring 101 to move regulator mechanism 100 downwardly to open port 106 and bleed pressure from chamber 104 to chamber 102 which is vented to atmosphere.

The reduction of pressure in chamber 104 is communicated through lines 107 and 109 (FIGS. 1, 3 and 5) to the chamber 110, allowing spring 113 to move rod 112 leftwardly (FIG. 5). The valve 114 is opened farther and the quantity of recycling meat is increased to reduce the pressure in line 55 which is then communicated to Bourdon tube 81 to close port 84 and reverse the operation of valve 114.

The described operation consists essentially of a "closed loop feed-back" principle in which meat pressure in the discharge line is sensed and operates a valve which recycles a quantity of the meat. The recycled portion is increased to lower the pressure in the discharge line and conversely the recycled portion is decreased to raise the pressure in the discharge line. Equilibrium is established and maintained by means of constant operation of regulating mechanism 80 which responds to changes of meat pressure to raise or lower the same so that said pressure remains substantially constant.

The described control achieves regulation of meat discharge pressure to a degree that pressure variation in line 55 is very small in the order of less than 1 p.s.i. change at a total pump pressure of about 100 p.s.i. for weiner product.

It has been found that as the meat flow is divided at T 53, the gaseous content of the meat is separated from the main flow of meat material which enters extruding or discharge branch line 55. Why this should occur is not completely understood, but such separation is substantiated and is a valuable and surprising discovery. To achieve the described separation there is a constant recycling of meat and for this reason the valve 114 is never fully closed.

It has been further discovered that separation of gas from the meat is effected most efficiently when the recycle branch line 58 has a vertically upward run on its return path to the hopper 25'.

In the line 52 is a pneumatic accumulator 120 which serves to damp high frequency pulsations on the meat flow in the conduit system 51. These pulsations are generally of too high a frequency to control by means of regulator 80 because the regulator does not respond quickly enough to make the necessary compensations. By a combination of regulator 80 and accumulator 120, the discharge pressure on the meat in line 55 is steady and produces a substantially even flow rate of meat discharge from the extruder nozzle 50.

In preparation for actual meat packaging operations, a selected extruder nozzle 50 is fitted into extruder device 45, and the proper pumping speed is set by controlling the r.p.m. of motor 43 with regulator 44. The pump 40 will then deliver meat material through line 51 at the proper rate, and under the appropriate pressure.

The larger the diameter of the meat product, the slower must be the linear rate of discharge at the extruder nozzle 50 because the greater bulk of material must be handled at a reduced linear rate. Since there is a direct relationship between the pressure in line 55 and the linear discharge rate of meat material at the extruder nozzle 50 the small diameter products which can be run at high linear speed, are therefore run under high extrusion pressures. These factors should also be related to the meat material itself, since certain meat materials are more subject to change under heat and must therefore be extruded under lower pressures.

As a specific example, it has been found that for packaging ¾" diameter weiner products, a motor speed setting of 90 r.p.m. and 100 p.s.i. extrusion pressure is suitable.

The speed of motor 43 is set sufficiently high so that pump 40 develops an initial pressure of about 102 p.s.i. on the meat material, the 2 p.s.i. pressure drop from the 100 p.s.i. extrusion pressure ensuring constant recycling of meat material through line 58.

The spray 121 (FIG. 1) is started to dampen meat product and table 122 where the meat product is received. The dampening of table 122 facilitates meat handling and reduces likelihood of damage to the meat product.

In preparation for the packing run, the operator places a length of artificial or natural casing 76 of the order of 50 feet onto the extruder horn 50. The casing 76 has been previously folded along its length into pleats as shown in FIG. 1. The end of the casing is then tied off.

While the discharge pressure of meat in line 22 is approximated by the appropriate setting of motor speed with control 44, the final adjustment is made by suitable setting of regulator 80 which achieves a more refined degree of pressure determination in discharge line 55.

The control handle 61 is then turned to a full "on" position operating the switch 70 to energize the motor 43 which then operates pump 40 to pump meat through line 51 and out the extruder horn 50. The extrusion pressure of the meat as it leaves the extruder nozzle 50 is maintained within plus or minus a fraction of 1 p.s.i. of the established 100 p.s.i. pressure appropriate to this product. The linear rate of weiner production is about 277 feet/minute or approximately 66.5 lbs. of product per minute.

For larger diameter products the extrusion pressure and linear rate of production will be appreciably lower. Extrustion pressures of about 25 p.s.i. are suitable for producing such items as bologna. There is of course a corresponding reduction in the pump speed for such products.

As the meat material discharges from the extruder nozzle 50, the operator controls the rate of feed off of the casing 76 by feel and he either frees or retards the casing so that it will pay out at a rate which is constantly proportioned to the discharge rate of the meat material which becomes packed in the casing 76. Uniformity in sizing of the products depends therefore upon the degree of success achieved in obtaining a uniform discharge rate of meat material.

If the meat material does discharge from extruder nozzle at various rates then the operator cannot generally relate the rate of casing pay out in accordance therewith and considerable weight variations arise with per unit lengths of meat material. This is undesirable since it is desired to package for sale the meat products in specified quantities viz. eight, ten, twelve to a package and obtain an expected weight for this member.

The fractional p.s.i. variation achieved as described enables the operator to package meat products having substantially uniform weight per unit length and hence the packages of meat will be of the same weight for the same units of product having the same lengths.

Uniform sizing of the meat product is achieved by means of directly sensing the discharge pressure of the meat material and controlling the meat flow in accordance therewith. In copending application of Rosenthaler, Serial No. 749,179, filed concurrently herewith, the same uniformity of sizing of the meat material is achieved by relating the flow of meat material to a hydraulic fluid flow in a separated system, regulating said hydraulic flow and then providing that the flow rates of hydraulic fluid and meat material remain substantially constantly proportional.

The run continues until the casing 76 or load of meat material in hopper 25' is exhausted. As previously mentioned a number of conical hoppers can be filled and held in storage or standby. When the hopper 25' is emptied the disconnect coupling 41 is quickly broken and the hopper 25' replaced with a different hopper having the desired contents.

Whenever it is desired to replace the hopper or provide a new casing the control handle 61 is moved to "off" position and the motor 43 is shut down. Moving the control handle 61 back to extruding portion will reactuate the motor 43 to renew the run.

The described process is useful in packaging a wide assortment of meat products, consisting of blended meat materials viz. pimento loaf, olive loaf, etc. which is dispersed in the meat material at the cutter 10 and then emptied into the hopper 15. Instead of discharging the meat into a casing a mold is provided for this purpose.

The specific feeder rates, pump speed, pumping pressure, etc. are factors depending upon the meat material, its content, and its emulsified state. The optimum operating conditions can be easily established by those skilled in the art as design desiderata.

While the process and form of apparatus herein described constitute preferred embodiments of the invention, it is to be understood that the invention is not limited to this precise process and form of apparatus, and that changes may be made therein without departing from the scope of the invention which is defined in the appended claims.

What is claimed is:

1. An apparatus for forming and processing meat products in casing, comprising a fixed displacement meat pump having an inlet adapted to receive flowable meat material and arranged to discharge said material under pressure, a closed conduit operatively connected with said pump to conduct a substantially continuous flow of meat material therethrough under pressure from said pump, said conduit having a first branch receiving the main flow of said meat material and being provided with an extruder for discharging the meat material into an awaiting casing therefor, said conduit further having a second branch to separate a portion of the meat material from said main flow of meat material and to simultaneously separate substantially all the gaseous content entrained with said material, said second branch being vertically inclined at its confluence with said first branch, and means connecting said second branch to said pump to recycle said separated meat material.

2. An apparatus for forming meat products, comprising a meat pump having an inlet adapted to receive flowable meat material and arranged to discharge said material under pressure, a closed conduit operatively connected with said pump to distribute said meat material under pressure from said pump, said conduit having a first branch receiving the main flow of meat material and having an extruder for discharging said meat material and a second branch connected to recycle a portion of said material, means for sensing the meat pressure in said first branch, and control means including a valve in flow controllable relation in said second branch and operatable in accordance with said sensing means to control the quantity of meat material recycled through said second branch to regulate said meat pressure in said first branch.

3. An apparatus for forming and processing meat products, comprising a variable speed fixed displacement pump having an inlet adapted to receive flowable meat material and arranged to discharge said material at variable predetermined rates, a closed conduit operatively connected with said pump to distribute said meat material under pressure from said pump, said conduit having a first branch for conducting the main flow of said meat material, an extruder nozzle at the outlet end of said first branch, said conduit further having a second branch for recycling a subsidiary flow of said meat material separated from said main flow to said pump inlet, and pressure control means having a pressure sensing element in said first conduit and a servo controlled valve in flow controlling relation in said second conduit for regulating the extruding pressure measured by said element according to predetermined pumping rates of said pump by regulating the rate of recycled material flow through said second conduit.

4. A continuous casing stuffer comprising a fixed displacement pump having an inlet adapted to receive flowable food product to be stuffed and a discharge outlet, a stuffing horn, first conduit means connecting said horn to receive said food product under pressure from said outlet, second conduit means connecting said outlet to said inlet, and controllable pressure regulating means including a pressure sensing element in said first conduit means adapted to provide a signal in proportion to said pressure, and a servo controlled regulating valve in said second conduit means responsive to said signal and arranged to increase flow in said second conduit with increased pressure in said first conduit above a predetermined minimum pressure.

5. A continuous casing stuffer adaptable for accommodating a wide variety of food types comprising a variable speed fixed displacement pump having an inlet adapted to receive flowable food product to be stuffed and an outlet arranged to discharge said product under pressure at variable rates, a stuffing horn, first conduit means connecting said horn to receive said food product under pressure from said outlet, second conduit means connecting said outlet to said inlet, and controllable pressure regulating means including a pressure sensing element in said first conduit means adapted to provide a signal in proportion to said pressure and a servo controlled valve in said second conduit means responsive to said signal and arranged to increase flow in said second conduit with increased pressure in said first conduit above a predetermined pressure.

References Cited in the file of this patent

UNITED STATES PATENTS

| | | |
|---|---|---|
| 577,494 | Schoenland | Feb. 23, 1897 |
| 1,505,218 | Sartore | Aug. 19, 1924 |
| 1,528,887 | Offenhauser | Mar. 10, 1925 |
| 1,797,137 | Gochnauer | Mar. 17, 1931 |
| 1,847,690 | Hottmann | Mar. 1, 1932 |
| 2,805,444 | Hensgen et al. | Sept. 10, 1957 |
| 2,851,073 | Schaller | Sept. 9, 1958 |
| 2,889,574 | Thielen et al. | June 9, 1959 |

FOREIGN PATENTS

| | | |
|---|---|---|
| 174,450 | Austria | Mar. 25, 1953 |